(12) United States Patent
Kameshima et al.

(10) Patent No.: US 8,624,991 B2
(45) Date of Patent: Jan. 7, 2014

(54) IMAGE PICKUP APPARATUS FOR READING A SIGNAL FROM A PANEL DETECTOR

(75) Inventors: Toshio Kameshima, Kumagaya (JP); Tadao Endo, Honjo (JP); Tomoyuki Yagi, Honjo (JP); Katsuro Takenaka, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/634,390

(22) Filed: Dec. 9, 2009

(65) Prior Publication Data
US 2010/0149391 A1  Jun. 17, 2010

(30) Foreign Application Priority Data

Dec. 12, 2008  (JP) ................................. 2008-317275

(51) Int. Cl.
| | | |
|---|---|---|
| H04N 5/228 | (2006.01) | |
| H04N 3/14 | (2006.01) | |
| H04N 5/335 | (2011.01) | |
| H04N 5/225 | (2006.01) | |
| H03M 1/66 | (2006.01) | |
| H05G 1/08 | (2006.01) | |

(52) U.S. Cl.
USPC ........ 348/222.1; 348/308; 348/341; 341/144; 378/91

(58) Field of Classification Search
USPC .............. 348/294–302, 308, 222.1, 241, 243; 341/144, 155; 250/208.1; 378/91
See application file for complete search history.

(56) References Cited

U.S. PATENT DOCUMENTS

| 6,831,686 | B1* | 12/2004 | Koren et al. ................... 348/243 |
|---|---|---|---|
| 7,522,199 | B2* | 4/2009 | Funakoshi et al. ............ 348/245 |
| 8,169,498 | B2* | 5/2012 | Yamashita ................. 348/222.1 |
| 2002/0154231 | A1* | 10/2002 | Decker et al. ................. 348/302 |
| 2003/0025820 | A1* | 2/2003 | Miyahara ...................... 348/323 |
| 2003/0202111 | A1* | 10/2003 | Park .............................. 348/243 |
| 2004/0012684 | A1* | 1/2004 | Tinnerino .................. 348/208.1 |
| 2005/0062865 | A1* | 3/2005 | Shibazaki ..................... 348/300 |
| 2006/0170799 | A1* | 8/2006 | Meisenzahl et al. .......... 348/294 |

(Continued)

FOREIGN PATENT DOCUMENTS

| JP | 2000-236475 A | 8/2000 |
|---|---|---|
| JP | 2000-236475 A | 8/2000 |

(Continued)

OTHER PUBLICATIONS

JP-2008-317275; Japanese Office Action; "Notification of Reasons for Refusal;" Dec. 12, 2012, pp. 1-6.

*Primary Examiner* — Kelly L Jerabek
(74) *Attorney, Agent, or Firm* — Canon U.S.A., Inc. IP Division

(57) ABSTRACT

An apparatus includes a detection unit including a plurality of pixels that are arranged in a matrix and that are divided into at least first and second pixel groups, a signal processing unit including first and second readout circuits and first and second A/D converters, a power supply unit configured to supply the components included in the signal processing unit with respective biases, and a control unit configured to control at least one of the signal processing unit and the power supply unit. The control unit is configured to perform processing of altering an analog signal capable of being input into at least one of the first and second A/D converters or altering an A/D conversion characteristic of at least one of the first and second A/D converters.

7 Claims, 7 Drawing Sheets

(56) References Cited

U.S. PATENT DOCUMENTS

| | | | |
|---|---|---|---|
| 2008/0036890 A1* | 2/2008 | Yamashita et al. | 348/308 |
| 2009/0009372 A1* | 1/2009 | Yamashita | 341/122 |
| 2010/0327176 A1* | 12/2010 | Takenaka et al. | 250/394 |
| 2011/0095169 A1* | 4/2011 | Takenaka et al. | 250/208.1 |

FOREIGN PATENT DOCUMENTS

| | | |
|---|---|---|
| JP | 2002-252808 A | 9/2002 |
| JP | 2002-252808 A | 9/2002 |
| JP | 2004-289241 A | 10/2004 |
| JP | 2005-136501 A | 5/2005 |
| JP | 2005-210396 A | 8/2005 |
| JP | 2005-210480 A | 8/2005 |
| JP | 2006-086971 A | 3/2006 |
| JP | 2006-086971 A | 3/2006 |
| JP | 2007-300183 A | 11/2007 |
| JP | 2007-336374 | * 12/2007 |

* cited by examiner

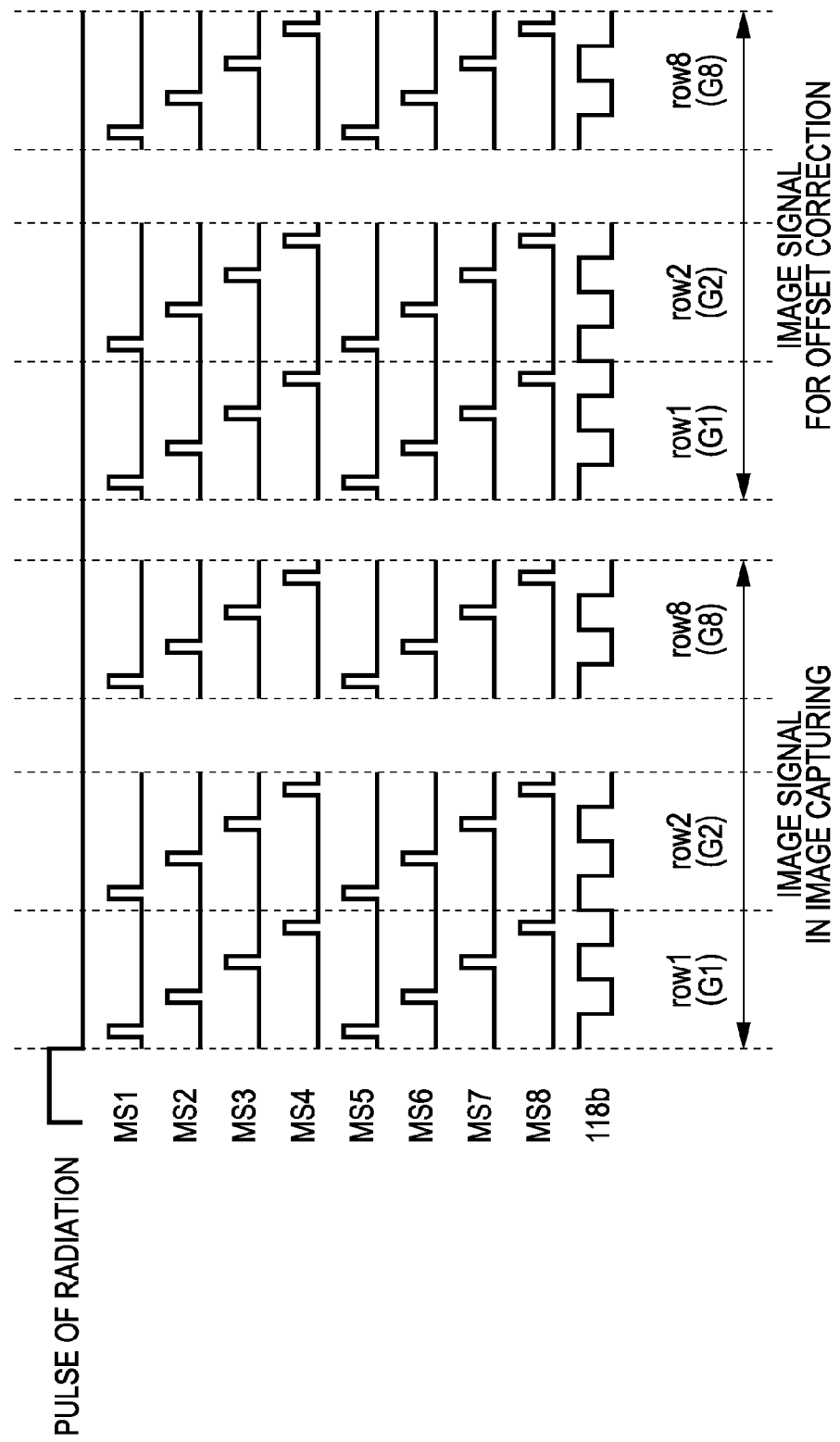

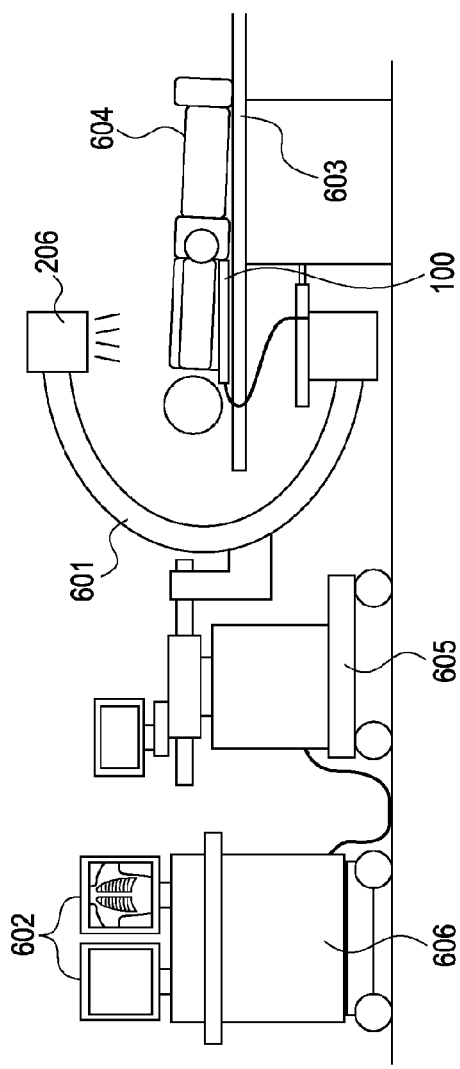
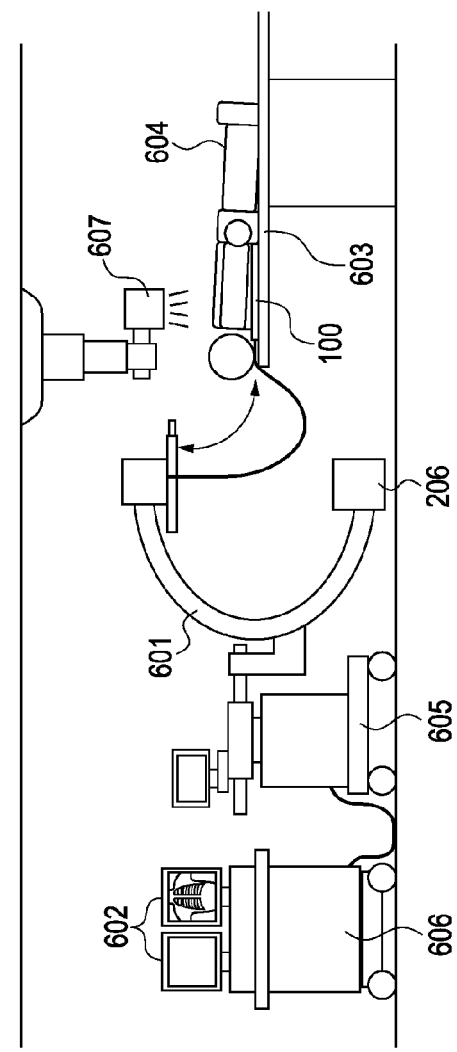
FIG. 7A
FIG. 7B

IMAGE PICKUP APPARATUS FOR READING A SIGNAL FROM A PANEL DETECTOR

BACKGROUND OF THE INVENTION

1. Field of the Invention

The present invention relates to an image pickup apparatus, a radiation image pickup apparatus, more particularly an image pickup apparatus and a radiation image pickup apparatus that are capable of reading a signal from a flat panel detector as digital output using a plurality of analog-to-digital (A/D).

2. Description of the Related Art

In recent years, a radiation image pickup apparatus employing a flat panel detector (hereinafter abbreviated as FPD) made of a semiconductor material has been becoming practical as an imaging apparatus for use in medical image diagnosis and nondestructive inspection using X rays. Such a radiation image pickup apparatus employing an FPD is an apparatus that can perform digital imaging of converting radiation, for example, an X ray that transmitted through an object (e.g., patient) into an analog electric signal using the FPD and converting the analog electric signal into a digital image signal. FPDs used in such a radiation image pickup apparatus can be broadly classified into the direct conversion type and the indirect conversion type. A direct-conversion radiation image pickup apparatus is an apparatus that includes an FPD having a plurality of pixels two-dimensionally arranged, each pixel including a conversion element made of a semiconductor material that can directly convert radiation into an electrical charge (e.g., a-Se). An indirect-conversion radiation image pickup apparatus is an apparatus that includes an FPD having a plurality of pixels two-dimensionally arranged, each pixel including a conversion element that has a wavelength conversion member that can convert radiation into light (e.g., fluorescent member) and that has a photoelectric conversion element made of a semiconductor material that can convert light into an electrical charge (e.g., a-Si). Such radiation image pickup apparatuses employing FPDs are used as digital image pickup apparatuses capable of radiographic imaging, like still imaging, and movie imaging, like fluoroscopy imaging.

In addition to an image signal in image capturing based on radiation that transmitted through an object, a correction image signal for use in correction of the image signal in image capturing, such as a correction image signal for use in offset correction or a correction image signal for use in sensitivity correction, is obtained from a radiation image pickup apparatus. A correction signal for use in offset correction is based on output obtained in a state where no light or radiation is applied to a detector (dark output). A correction signal for use in sensitivity correction is based on output obtained in a state where light or radiation is applied to a detector in a substantially uniform manner (bright output). Correcting an image signal in image capturing using such a correction image signal enables the image signal to have low noise and high precision.

The radiation image pickup apparatus includes the above-described detector, a driving circuit for driving the detector, a readout circuit for reading an analog electric signal from the detector, and an A/D converter for converting the analog electric signal into a digital signal. The A/D converter outputs a digitized image signal in image capturing and a correction image signal. To output an image signal in a shorter time from the image pickup apparatus, the image pickup apparatus includes a plurality of A/D converters.

However, a conversion characteristic between an input analog electric signal and an output digital signal in an A/D converter (A/D conversion characteristic) may have nonlinearity that does not exhibit ideal linearity. In particular, for an image pickup apparatus including a plurality of A/D converters, the A/D converters may have different nonlinearities, and an image formed from a digital signal may have artifact, such as a step. In such a case, where artifact, such as a step, occurs, the nonlinearities should be reduced or effects caused by nonlinearities should be compensated for.

Japanese Patent Laid-Open No. 2005-210480 discloses an A/D converter circuit that stores, at an address specified by an output from an A/D conversion unit, a reference signal synchronized using an output signal from the A/D conversion unit as address data and that corrects the output signal from the A/D conversion unit in accordance with the reference signal. The patent document discloses the capability to reduce artifact in image caused by nonlinearity of the A/D conversion unit and to achieve high image quality by use of the above configuration.

Japanese Patent Laid-Open No. 2005-210396 discloses an A/D converter circuit that includes a correcting unit configured to correct output signals from a plurality of A/D conversion units in accordance with an output signal from either one of the plurality of A/D conversion units. The patent document discloses the capability to reduce artifact in image caused by difference between nonlinearities of the plurality of A/D conversion units and to achieve high image quality by use of the above configuration.

The techniques described in the above patent documents can reduce artifact resulting from nonlinearity of an A/D converter by correcting digital output from the A/D converter, as described above. However, there may be an issue in that, for correction described in the above patent documents, a significantly large circuit for correcting digital output is used. There may be also an issue in that the step of previously obtaining conversion data for use in correcting nonlinearity of each A/D converter and the step of performing digital correction for every digital output results in complication of the system.

SUMMARY OF THE INVENTION

According to an aspect of the present invention, an apparatus includes a detection unit, a signal processing unit, a power supply unit, and a control unit. The detection unit includes a plurality of pixels arranged in a matrix. Each of the plurality of pixels is configured to convert radiation or light into an analog signal. The plurality of pixels are divided into at least a first pixel group and a second pixel group. The signal processing unit includes a first readout circuit configured to read an analog signal output from the first pixel group, a second readout circuit configured to read an analog signal output from the second pixel group, a first analog-to-digital (A/D) converter configured to convert an analog signal from the first readout circuit into a digital signal, and a second A/D converter configured to convert an analog signal from the second readout circuit into a digital signal. The power supply unit is configured to supply components included in the signal processing unit with respective biases. The control unit is configured to control at least one of the signal processing unit and the power supply unit. The control unit is configured to perform processing of altering an analog signal capable of being input into at least one of the first and second A/D converters or altering an A/D conversion characteristic of at least one of the first and second A/D converters.

Further features of the present invention will become apparent from the following description of exemplary embodiments with reference to the attached drawings.

BRIEF DESCRIPTION OF THE DRAWINGS

FIG. 4 is a timing chart for use in describing operations of the image pickup apparatus according to the first embodiment of the present invention.

FIGS. 7A and 7B are conceptual diagrams of radiation image pickup systems that employ an image pickup apparatus according to the present invention.

DESCRIPTION OF THE EMBODIMENTS

Embodiments to which the present invention is suitably applicable will be described in detail below with reference to the drawings. In the embodiments, radiation is described as including electromagnetic waves, such as X-rays and gamma rays, alpha rays, and beta rays.

Figure 1:
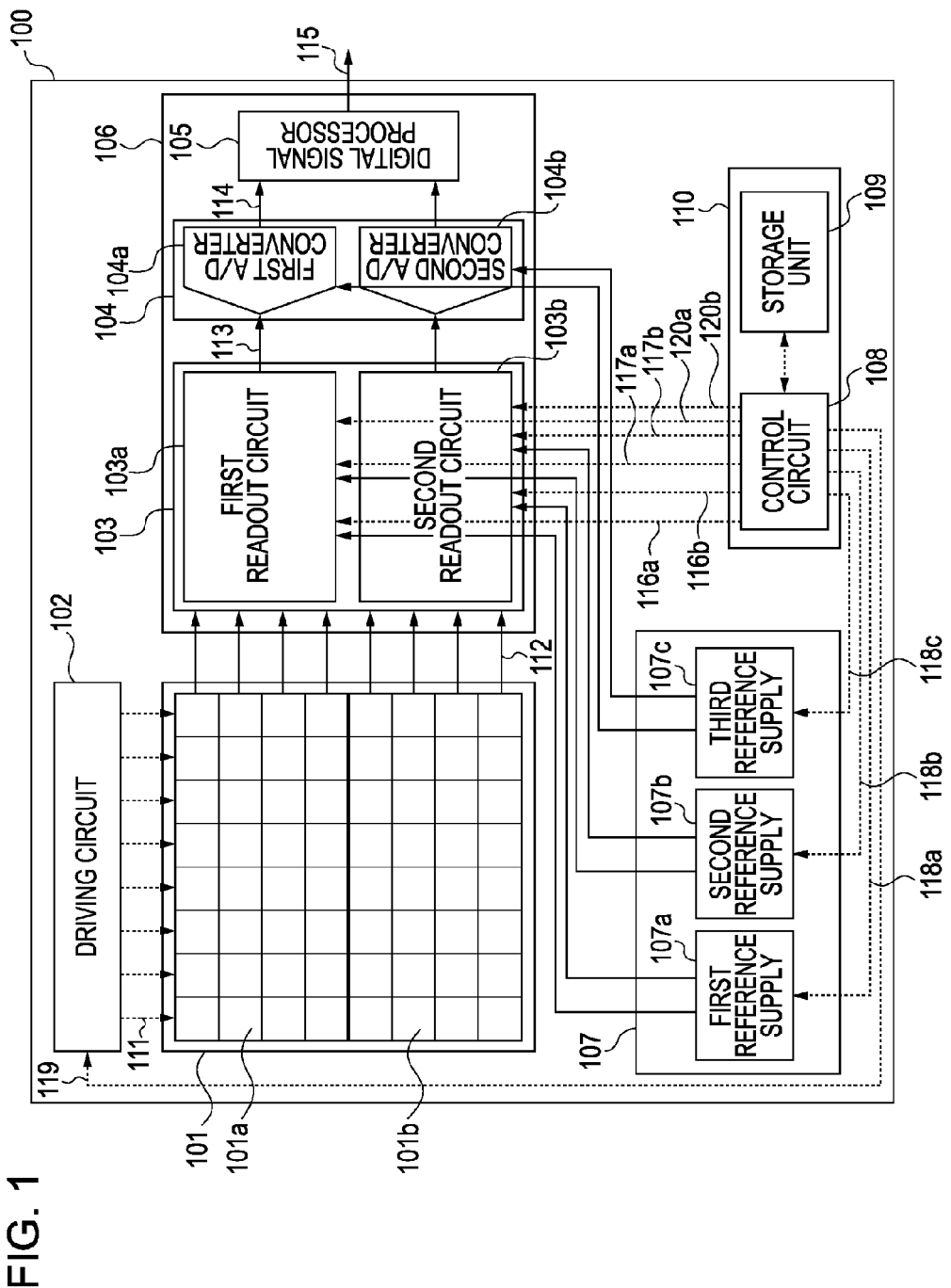
FIG. 1 is a conceptual block diagram of an image pickup apparatus according to a first embodiment of the present invention.

FIG. 1 is a conceptual block diagram of an image pickup apparatus according to a first embodiment of the present invention. An image pickup apparatus 100 illustrated in FIG. 1 includes a detector 101 having a plurality of pixels arranged in a matrix, each pixel being configured to convert radiation or light into an analog electric signal, and a driving circuit 102 configured to drive the detector 101 in order to make the detector 101 output an analog electric signal. In the present embodiment, for the sake of simplification of description, the detector 101 has a form having pixels of 8 rows by 8 columns, and the pixels are divided into a first pixel group 101a and a second pixel group 101b, each pixel group having 4 pixel columns as one set. An analog electric signal output from the first pixel group 101a is read by an associated first readout circuit 103a. An analog electric signal 113 from the first readout circuit 103a is converted into a digital signal 114 by an associated first A/D converter 104a. Similarly, an analog electric signal from the second pixel group 101b is read by an associated second readout circuit 103b and converted by an associated second A/D converter 104b into a digital signal. The digital signals from the first and second A/D converters 104a and 104b are subjected to simple digital signal processing, such as digital multiplex processing or offset correction, by a digital signal processor 105, and the processed digital signal is output. A signal processing device 106 includes a readout circuit portion 103 including the first and second readout circuits 103a and 103b, an A/D converting portion 104 including the first and second A/D converters 104a and 104b, and the digital signal processor 105. The image pickup apparatus 100 further includes a power supply portion 107 configured to supply the components included in the signal processing device 106 with respective biases. The power supply portion 107 includes first and second reference supplies 107a and 107b configured to supply the readout circuit portion 103 with a reference voltage and a third reference supply 107c configured to supply the A/D converting portion 104 with a reference voltage. The image pickup apparatus 100 further includes a controller 110 configured to control at least one of the signal processing device 106 and the power supply portion 107.

The controller 110 includes a storage unit 109 in which information relating to nonlinearity of each of the first and second A/D converters 104a and 104b and a control circuit 108 configured to control at least one of the signal processing device 106 and the power supply portion 107 on the basis of the information. The control circuit 108 supplies the first and second reference supplies 107a and 107b with first and second reference voltage adjusting signals 118a and 118b, respectively, and supplies the third reference supply 107c with a third reference voltage adjusting signal 118c. The control circuit 108 also supplies the readout circuit portion 103 with gain adjusting signals 116a, 116b, 117a, and 117b and control signals 120a and 120b. The control circuit 108 also supplies the driving circuit 102 with a drive control signal 119. In response to the signal, the driving circuit 102 supplies the detector 101 with a driving signal 111.

Figure 2:
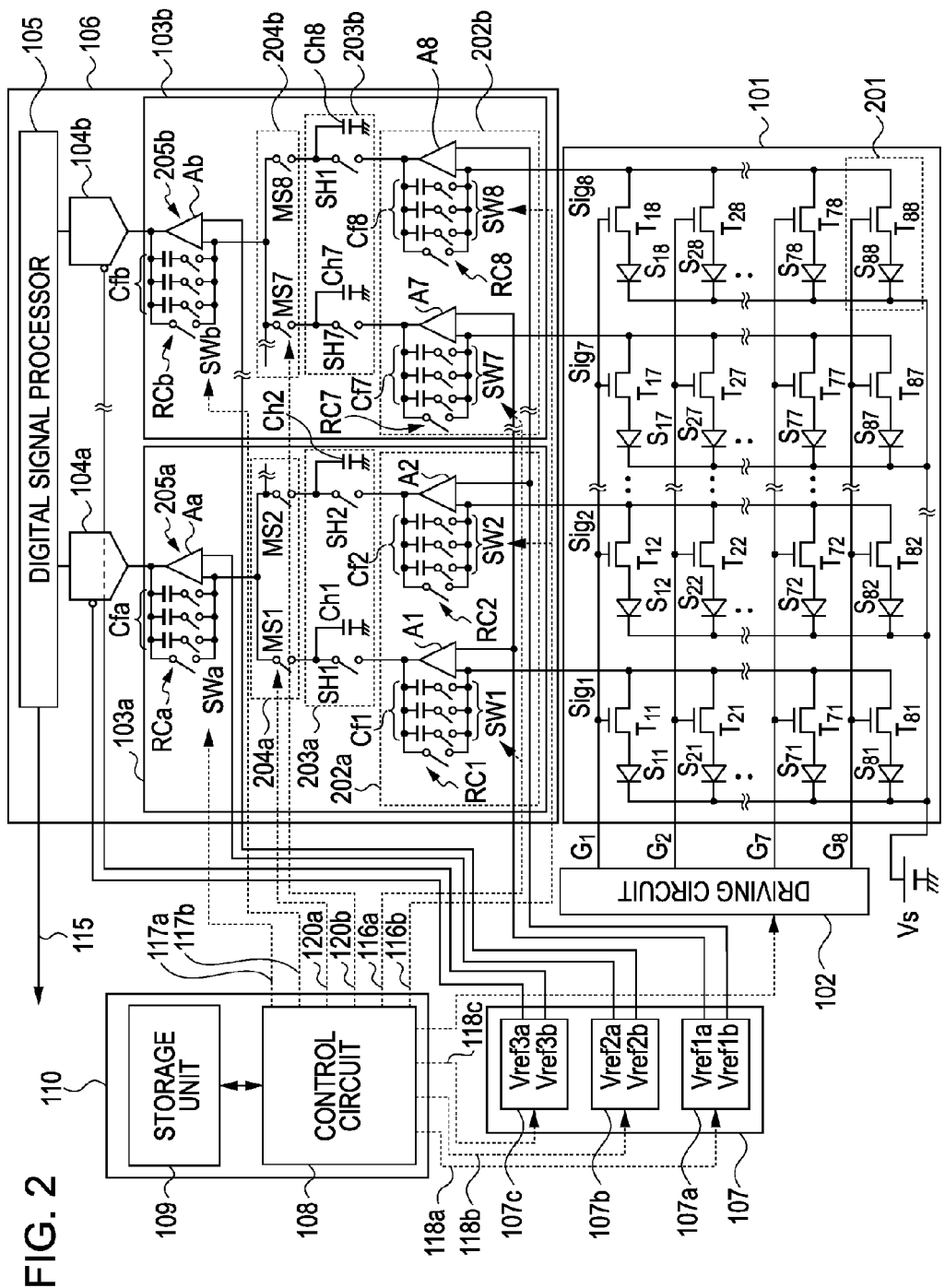
FIG. 2 is a conceptual diagram of an image pickup system, the conceptual diagram containing an equivalent circuit diagram of the image pickup apparatus according to the first embodiment of the present invention.

FIG. 2 is a conceptual diagram of an image pickup system, the conceptual diagram containing a conceptual equivalent circuit diagram of the image pickup apparatus according to the first embodiment of the present invention. The same reference numerals are used in components having the same configurations as ones described using FIG. 1, and the detailed description thereof is omitted. The detector 101 includes pixels 201 arranged in a matrix. In FIG. 2, the 8×8 pixels 201 arranged in a matrix with 8 rows by 8 columns are arranged. Each of the pixels 201 includes a conversion element S for converting radiation or light into an electrical charge and a switching element T for outputting an electric signal corresponding to the electrical charge. As a conversion element S for converting light into an electrical charge, a photoelectric conversion element, such as a PIN photodiode whose principal material is amorphous silicon and being arranged on an insulating substrate (e.g., glass substrate), can be suitably used. As a conversion element S for converting radiation into an electrical charge, an indirect conversion element including a wavelength conversion member being at the radiation entry side of the photoelectric conversion element and being for converting radiation into light that can be sensed by the photoelectric conversion element and a direct conversion element for directly converting radiation into an electrical charge can be suitably used. As the switching element T, a transistor including a control terminal and two main terminals can be suitably used; in the case of a pixel in which a photoelectric conversion element is disposed on an insulating substrate, a thin-film transistor (TFT) can be suitably used. The conversion element S includes a first electrode electrically connected to one of the two main terminals of the switching element T and a second electrode electrically connected to a bias power supply through common wiring. For switching elements of a plurality of pixels in the row direction, for example, $T_{11}$ to $T_{18}$, their control terminals are commonly electrically connected to driving wiring $G_1$ in the first row, and a driving signal for controlling a conductive state of each of the switching elements is supplied from the driving circuit 102 through the driving wiring on a row-by-row basis. For switching elements of a plurality of pixels in the column direction, for example, $T_{11}$ to $T_{81}$, their second main terminals are electrically connected to signal wiring $Sig_1$ in the first column, and, during the conductive state, electric signals corresponding to electrical charges of the conversion elements are output to the readout circuit portion 103 through the signal wiring. Through a plurality of signal wiring $Sig_1$ to $Sig_8$ extending in the column direction, electric signals output from a plurality of pixels of the detector 101 are transmitted in parallel to the readout circuit portion 103. In the present embodiment, the detector 101 is divided into the first pixel group 101a and the second pixel group 101b, each pixel group having four pixel columns as one set. Analog electric signals output from the first pixel group 101a are read in parallel by the associated first readout circuit 103a in the readout circuit portion 103, whereas analog electric signals output from the second pixel group 101b are read in parallel by the associated second readout circuit 103b.

The first readout circuit 103a includes a first amplifier circuit section 202a configured to amplify electric signals output in parallel from the first pixel group 101a and a first sample-and-hold circuit section 203a configured to sample and hold electric signals from the first amplifier circuit section 202a. Similarly, the second readout circuit 103b includes a second amplifier circuit section 202b and a second sample-and-hold circuit section 203b. Each of the first and second amplifier circuit sections 202a and 202b includes an amplifier circuit for each signal wiring, the amplifier circuit including an operational amplifier 'A' configured to amplify a read electric signal and output it, an integration capacitor group Cf, a switch group SW configured to switch an amplification factor, and a reset switch RC configured to reset the integration capacitors. An output electric signal is input into an inverting input terminal of the operational amplifier A, and an amplified electric signal is output from an output terminal. A reference voltage Vref1a is input from the first reference supply 107a into a non-inverting input terminal of each of the amplifier circuits in odd-numbered columns, whereas a reference voltage Vref1b is input from the first reference supply 107a into a non-inverting input terminal of each of the amplifier circuits in even-numbered columns. The integration capacitor group Cf having a plurality of integration capacitors arranged in parallel is disposed between the inverting input terminal and the output terminal of the operational amplifier A. Each of the first and second sample-and-hold circuit sections 203a and 203b includes a sample-and-hold circuit for each amplifier circuit, the sample-and-hold circuit being made up of a sampling switch SH and a sampling capacitor Ch. The first and second readout circuits 103a and 103b further include first and second multiplexers 204a and 204b, respectively. Each of the first and second multiplexers 204a and 204b is configured to sequentially output electric signals read in parallel from the first or second sample-and-hold circuit section as image signals being serial signals. The first and second readout circuits 103a and 103b further include first and second variable amplifiers 205a and 205b, respectively. Each of the first and second variable amplifiers 205a and 205b is an output buffer configured to impedance-convert an image signal and output it. The first multiplexer 204a and the second multiplexer 204b include switches MS1 to MS4 and switches MS5 to MS8, respectively, corresponding to each signal wiring, and parallel signals are converted into serial signals by sequential selection of the switches. The first variable amplifier 205a includes an operational amplifier Aa configured to amplify an electric signal from the first multiplexer 204a and output it, an integration capacitor group Cfa, a switch group SWa configured to switch an amplification factor, and a reset switch RCa configured to reset the integration capacitors. Similarly, the second variable amplifier 205b includes an operational amplifier Ab, an integration capacitor group Cfb, a switch group SWb configured to switch an amplification factor, and a reset switch RCb configured to reset the integration capacitors. A reference voltage Vref2a is input from the second reference supply 107b into a non-inverting input terminal of the first variable amplifier 205a, whereas a reference voltage Vref2b is input from the second reference supply 107b into a non-inverting input terminal of the second variable amplifier 205b. A reference voltage Vref3a is input from the third reference supply 107c into the first A/D converter 104a associated with the first readout circuit 103a, whereas a reference voltage Vref3b is input from the third reference supply 107c into the second A/D converter 104b associated with the second readout circuit 103b.

The control circuit 108 supplies the gain adjusting signal 116a and the gain adjusting signal 116b to the amplifier circuits in odd-numbered columns and the amplifier circuits in even-numbered columns, respectively, among the plurality of amplifier circuits included in the first and second amplifier circuit sections 202a and 202b. The control circuit 108 supplies the first variable amplifier 205a with the gain adjusting signal 117a and supplies the second variable amplifier 205b with the gain adjusting signal 117b. The control circuit 108 controls at least one of the signal processing device 106 and the power supply portion 107 on the basis of information stored in the storage unit 109, which stores information regarding nonlinearity of each of the first and second A/D converters 104a and 104b. In addition, the control circuit 108 supplies the first multiplexer 204a with the control signal 120a and supplies the second multiplexer 204b with the control signal 120b.

Information regarding nonlinearity of an A/D converter will be described below. This nonlinearity indicates how much the relationship between actual analog input and digital output (A/D conversion value) deviates from an ideal line and is specifically represented by differential nonlinearity (DNL) or integral nonlinearity (INL). INL means a deviation of, when an input-output characteristic of an A/D converter is viewed as a whole, an actual input-output characteristic from an ideal input-output line. DNL means a deviation of, when input-output stages are individually viewed, each stage from its ideal stage.

Figure 3A:
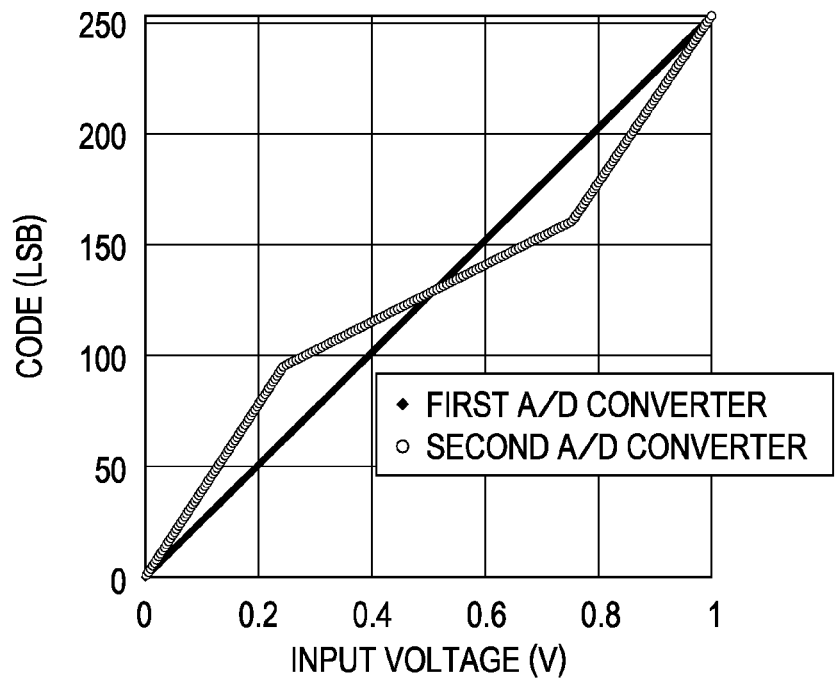
FIGS. 3A and 3B illustrate characteristics for use in describing effects caused by difference between A/D conversion characteristics of A/D converters.

Effects caused by difference between A/D conversion characteristics of the first and second A/D converters will be described below using FIGS. 3A and 3B. First, nonlinearity of each of the first and second A/D converters 104a and 104b is illustrated using FIG. 3A. Here, the case is illustrated in which the first A/D converter 104a has an ideal A/D conversion characteristic, whereas the second A/D converter 104b exhibits nonlinearity deviating from an ideal characteristic. In FIG. 3A, the horizontal axis indicates an input voltage input into an A/D converter, and the vertical axis indicates a digital value (code) output from the A/D converter. For the sake of simplification of description, FIG. 3A is an illustration with the assumption that the A/D converter has a resolution of 8 bits.

Figure 3B:
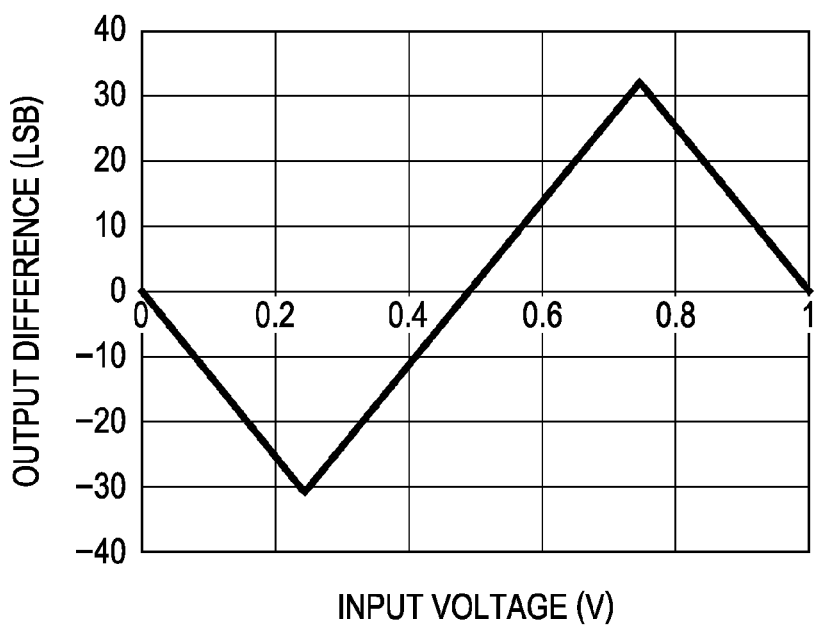

FIG. 3B illustrates a difference between digital values with respect to input voltages of the first and second A/D converters 104a and 104b. According to FIG. 3B, when input voltages of the first and second A/D converters 104a and 104b are converted into digital values and output without being processed, a maximum output difference between the digital values of the A/D converters is approximately 30 LSB. Therefore, a maximum difference in an image of approximately 30 LSB may occur between the first and second pixel groups 101a and 101b associated with the first and second A/D converters 104a and 104b, respectively. In particular, like the present embodiment, for the form in which the first and second pixel groups divide all the region of the detector 101, it results in a visually highly noticeable difference occurring in the border between the first and second pixel groups, so the quality of an obtained image significantly decreases.

To address this, in the embodiment of the present invention, the controller 110 performs processing of altering an analog electric signal capable of being input into at least one of the first and second A/D converters or altering an A/D conversion characteristic of at least one of the first and second A/D converters. In the present embodiment, for example, the controller 110 performs processing on an analog electric signal from the pixels in odd-numbered columns among the plurality of pixels included in the first or second pixel group, the processing being different from alteration of an analog electric signal from the pixels in even-numbered columns. In other words, in a plurality of pixels arranged in the row direction among a plurality of pixels included in the first or second pixel group, an analog electric signal from a predetermined pixel is subjected to processing different from alteration of an analog electric signal from another pixel different from the predetermined pixel. Alternatively, within a period of time for which analog electric signals from a plurality of pixels arranged in the row direction among a plurality of pixels included in the detector are processed, a reference voltage to be supplied to each of the first and second A/D converters is subjected to alteration processing. Such processing causes variations in analog electric signal in the row direction, and the variations produce an output difference in digital output value within pixel groups. The output difference within pixel groups makes the output difference at the border between pixel groups less noticeable, so the difference is less noticeable than that occurring when the processing is not performed. This depends on visual features of a person who observes an image. Because of visual filtering effects, a step between pixel groups is identified more easily than a difference between analog electric signals between unit pixel columns, so the benefit of improving an image quality is high. In the present embodiment, to perform the above processing, the controller 110 performs at least one of processing described below.

As first processing, the controller 110 may have to control the first reference supply 107a. The first reference supply 107a alters at least one of the reference voltage Vref1a to be supplied to an amplifier circuit associated with a predetermined pixel column and the reference voltage Vref1b to be supplied to another amplifier circuit associated with a different pixel column different from the predetermined pixel column such that the reference voltages Vref1a and Vref1b have different voltage values. For example, an odd-numbered pixel column can be adopted as the predetermined pixel column, whereas an even-numbered pixel column can be adopted as the different pixel column.

As second processing, the controller 110 may have to control the second reference supply 107b. The second reference supply 107b alters at least one of the reference voltage Vref2a to be supplied to the first variable amplifier 205a and the reference voltage Vref2b to be supplied to the second variable amplifier 205b such that the reference voltages Vref2a and Vref2b have different voltage values. This alteration is performed in synchronization with an operation of converting parallel signals into serial signals and outputting them as image signals, the operation being carried out by the first and second multiplexers. For example, in the case of FIG. 2, it is performed in synchronization with an operation of selecting the switches MS1 to MS4 and MS5 to MS8 included in the first and second multiplexers corresponding to the signal wiring $Sig_1$ to $Sig_8$.

As third processing, the controller 110 alters at least one of an amplification factor of an amplifier circuit associated with a predetermined pixel column and an amplification factor of an amplifier circuit associated with a different pixel column different from the predetermined pixel column such that the amplification factors are different, as needed. For example, the controller 110 controls the amplification factors by supplying the gain adjusting signal 116a to a switch group of an amplifier circuit associated with an odd-numbered pixel column and supplying the gain adjusting signal 116b to a switch group of an amplifier circuit associated with an even-numbered pixel column.

As fourth processing, the controller 110 alters at least one of an amplification factor of the first variable amplifier 205a and an amplification factor of the second variable amplifier 205b such that the amplification factors are different, as needed. This alteration is also performed in synchronization with an operation carried out by the first and second multiplexers, as in the second processing.

As fifth processing, the controller 110 controls the third reference supply 107c as needed in order to shift at least one of the levels of the A/D conversion characteristics of the first and second A/D converters 104a and 104b. The third reference supply 107c alters at least one of the reference voltage Vref3a to be supplied to the first A/D converter 104a and the reference voltage Vref3b to be supplied to the second A/D converter 104b such that the reference voltages Vref3a and Vref3b have different voltage values. This alteration is also performed in synchronization with an operation carried out by the first and second multiplexers, as in the second processing.

It is useful that the controller 110 perform the above-described processing on the basis of information regarding nonlinearity of each of the first and second A/D converters 104a and 104b stored in the storage unit 109. In this case, the processing can be performed such that, on the basis of that information, a difference between a mean value of digital signals output from the first A/D converter 104a and a mean value of digital signals output from the second A/D converter 104b is reduced. This enables processing of reducing a difference with higher precision.

It is to be noted that, if the above-described processing is performed on only an image signal in image capturing, an unnecessary signal component is added to an image signal to be obtained, so accuracy of the obtained image signal may decrease. To address this, in the embodiment of the present invention, an image signal in image capturing and a correction image signal for use in correction of the image signal in image capturing, such as an image signal for offset correction or an image signal for sensitivity correction, are obtained by substantially the same processing. Then, the digital signal processor 105 performs correction using the obtained correction image signal and the obtained image signal in image capturing and outputs the corrected image signal. Such processing enables an image whose added unnecessary signal component is removed or reduced, artifact, such as a step, is reduced, and image quality is good to be obtained.

Specific processing will be described in detail below using FIGS. 2 to 4. FIG. 4 is a timing chart for use in describing an operation of the image pickup apparatus when the second processing is used in obtainment of an image signal in image capturing and in obtainment of an offset correction image signal.

After a pulse of radiation is applied to the image pickup apparatus, electric signals are read from a plurality of pixels on a row-by-row basis in order to obtain an image signal in image capturing. Signals read in parallel from the first pixel group 101a to the first readout circuit 103a on a row-by-row basis are converted into serial signals by sequential selection of the switches MS1 to MS4 of the first multiplexer 204a. Similarly, signals read in parallel from the second pixel group 101b to the second readout circuit 103b on a row-by-row basis are converted into serial signals by sequential selection of the switches MS5 to MS8 of the second multiplexer 204b. In the present embodiment, the switch MS1 of the first multiplexer 204a and the switch MS5 of the second multiplexer 204b are selected at substantially the same timing. Similarly, the switches MS2 and MS6, the switches MS3 and MS7, and the switches MS4 and MS8 are selected at substantially the same respective timings. Such selection enables signals to be read in parallel from the first and second pixel groups 101a and 101b, so the speed of reading can be enhanced. For the processing illustrated in FIG. 4, a reference voltage to be supplied to each of the first and second variable amplifiers is controlled using the second reference voltage adjusting signal 118b in synchronization with an operation of selecting a switch included in the first and second multiplexers. In FIG. 4, the control is performed such that when a switch in an odd-numbered column is selected, the reference voltage is set higher than a preset reference voltage; when a switch in an even-numbered column is selected, the preset reference voltage is used.

Then, after an image signal in image capturing is obtained, in a period of time substantially the same as the period of time of the application of the previous pulse of radiation, a dark-time output based on an electrical charge generated by a conversion element when no radiation is applied to the image pickup apparatus is obtained, i.e., an offset correction image signal is obtained. Also in obtaining such an offset correction image signal, substantially the same processing is performed as in obtaining an image signal in image capturing. An offset correction is carried out by subtracting the offset correction image signal from the obtained image signal in image capturing, so the corrected image signal is obtained. In the present specific example, the amount of change in reference voltage supplied to each variable amplifier may be determined in real time by the controller 110 using calculation based on information stored in the storage unit 109, or it may be determined in advance based on information regarding nonlinearity of each of the first and second A/D converters.

In the present specific example, an offset correction image signal is obtained after an image signal in image capturing is obtained. However, the embodiment of the present invention is not limited to this example. For example, an offset correction image signal may be obtained in advance through processing, and an image signal in image capturing may be obtained through substantially the same processing.

In the present embodiment, A/D conversion is carried out using two different ways of alteration processing, in which one corresponds to an even-numbered column and the other corresponds to an odd-numbered column. It is useful that more than two ways, for example, four ways be adopted. In addition, it is useful that the embodiment of the present invention be applied to an A/D converter whose structure tends to cause nonlinear error, such as a pipeline A/D converter.

In the present embodiment, two A/D converters are used. Of course, the embodiment of the present invention may be applied to the case where more than two A/D converters are used. Although it is useful that all A/D converters be subjected to alteration processing, only part of the plurality of A/D converters can be subjected to alteration processing.

As each reference supply used in the present embodiment, a publicly known variable power supply, such as one capable of simply outputting two voltage values or one including a D/A converter and capable of achieving finer adjustment, can be suitably used.

Figure 5:
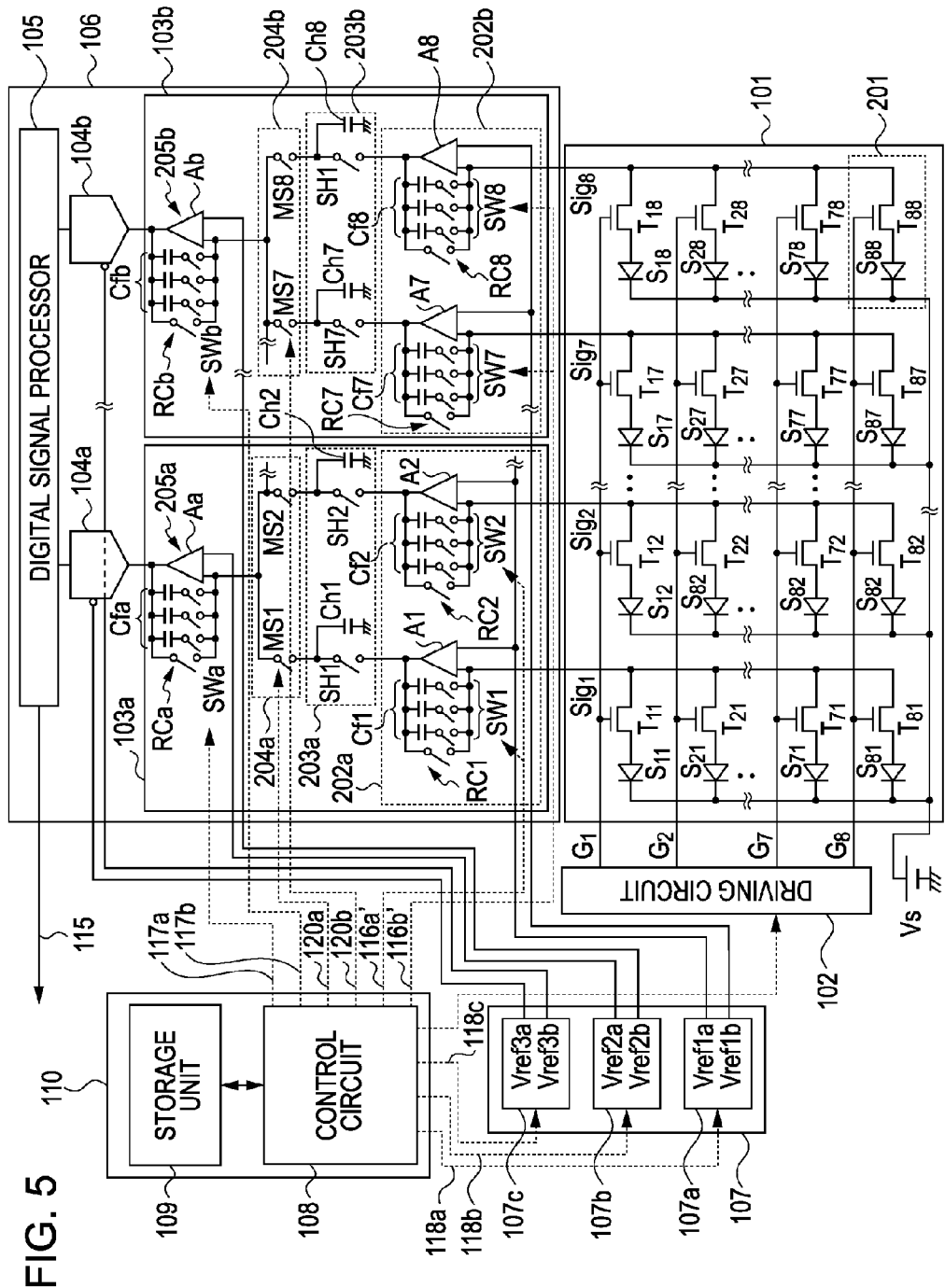
FIG. 5 is a conceptual diagram of an image pickup system, the conceptual diagram containing an equivalent circuit diagram of an image pickup apparatus according to a second embodiment of the present invention.

A second embodiment of the present invention will now be described below using FIG. 5. FIG. 5 is a conceptual diagram of an image pickup system, the conceptual diagram containing an equivalent circuit diagram of an image pickup apparatus according to a second embodiment of the present invention. The same reference numerals are used in components having the same configurations as ones described in the first embodiment, and the detailed description thereof is omitted.

In the first embodiment, in a plurality of pixels arranged in the row direction among a plurality of pixels included in the first or second pixel group, an analog electric signal from a predetermined pixel is subjected to processing different from alteration of an analog electric signal from a different pixel from the predetermined pixel. Alternatively, within a period of time for which analog electric signals from a plurality of pixels arranged in the row direction among a plurality of pixels included in the first or second pixel group are processed, a reference voltage to be supplied to each of the first and second A/D converters is subjected to alteration processing. In contrast to this, in the second embodiment, processing different from alteration of an analog electric signal from a pixel included in the second pixel group is performed on an analog electric signal from a pixel included in the first pixel group. Alternatively, processing different from alteration of an A/D conversion characteristic of the second A/D converter is performed on the first A/D converter. That is, this processing reduces a difference being the difference between a mean value of image signals obtained from the first pixel group and a mean value of image signals obtained from the second pixel group, as compared with the case in which no such processing is performed. That is, the processing is performed for each readout circuit or each A/D converter associated with each pixel group so as to reduce an output difference between a plurality of A/D converters. The above-described processing is performed so as to reduce a difference being the difference between a mean value of digital signals output from the first A/D converter and a mean value of digital signals output from the second A/D converter. It is to be noted that, in the present embodiment, for control for each readout circuit, the controller 110 supplies the first amplifier circuit section 202a with a gain adjusting signal 116a' and supplies the second amplifier circuit section 202b with a gain adjusting signal 116b'. The first reference supply 107a supplies the first amplifier circuit section 202a with the reference voltage Vref1a and supplies the second amplifier circuit section 202b with the reference voltage Vref1b. Such processing reduces the difference between mean values of image signals associated with pixel groups and results in a reduction in difference, as compared with the case in which no such processing is performed. In the present embodiment, to perform the above-described processing, the controller 110 carries out at least one of processing described below.

As first processing, the controller 110 controls the first reference supply 107a as needed. The first reference supply 107a alters at least one of the reference voltage Vref1a to be supplied to the first amplifier circuit section 202a and the reference voltage Vref1b to be supplied to the second amplifier circuit section 202b such that the reference voltages Vref1a and Vref1b have different voltage values.

As second processing, the controller 110 controls the second reference supply 107b as needed. The second reference supply 107b alters at least one of the reference voltage Vref2a to be supplied to the first variable amplifier 205a and the reference voltage Vref2b to be supplied to the second variable amplifier 205b such that the reference voltages Vref2a and Vref2b have different voltage values.

As third processing, the controller 110 alters at least one of an amplification factor of the first amplifier circuit section 202a and an amplification factor of the second amplifier circuit section 202b such that the amplification factors are different, as needed.

As fourth processing, the controller 110 alters at least one of an amplification factor of the first variable amplifier 205a and an amplification factor of the second variable amplifier 205b such that the amplification factors are different, as needed.

As fifth processing, the controller 110 controls the third reference supply 107c as needed in order to shift at least one of the levels of the A/D conversion characteristics of the first and second A/D converters 104a and 104b. The third reference supply 107c alters at least one of the reference voltage Vref3a to be supplied to the first A/D converter 104a and the reference voltage Vref3b to be supplied to the second A/D converter 104b such that the reference voltages Vref3a and Vref3b have different voltage values.

It is useful that the controller 110 perform the above-described processing on the basis of information regarding nonlinearity of each of the first and second A/D converters 104a and 104b stored in the storage unit 109. The above-described processing is performed so as to reduce a difference being the difference between a mean value of digital signals output from the first A/D converter and a mean value of digital signals output from the second A/D converter, as compared with the case in which no such processing is performed. This enables reduction in difference with higher precision. For example, the case is described below in which the above second processing is performed in obtaining a correction image signal for offset correction using the first and second A/D converters 104a and 104b having the characteristics illustrated in FIG. 3A. A case is discussed where a predetermined reference voltage is supplied to each of the first and second variable amplifiers 205a and 205b and, for example, offset correction image signals having a mean value of approximately 0.2 (V) are output from the first and second variable amplifiers. In contrast, processing is performed such that a reference voltage to be supplied to the second variable amplifier 205b is lower than a predetermined reference voltage and offset correction image signals having a mean value of approximately 0.1 (V) are output from the second variable amplifier 205b. This enables reduction in difference between mean values of digital signals output from the first and second A/D converters. It is to be noted that, when information regarding nonlinearity of each of the first and second A/D converters is obtained in advance, the processing may be set in advance.

Also in the present embodiment, an image signal in image capturing and a correction image signal for use in correction of the image signal in image capturing, such as an offset correction image signal or a sensitivity correction image signal, are obtained by substantially the same processing such that they have substantially the amount of change, as in the case of the first embodiment. Then, the digital signal processor 105 performs correction using the obtained correction image signal and the obtained image signal in image capturing and outputs the corrected image signal. Such processing enables an image whose added unnecessary signal component is removed or reduced, artifact, such as a step, is reduced, and image quality is good to be obtained.

Figure 6:
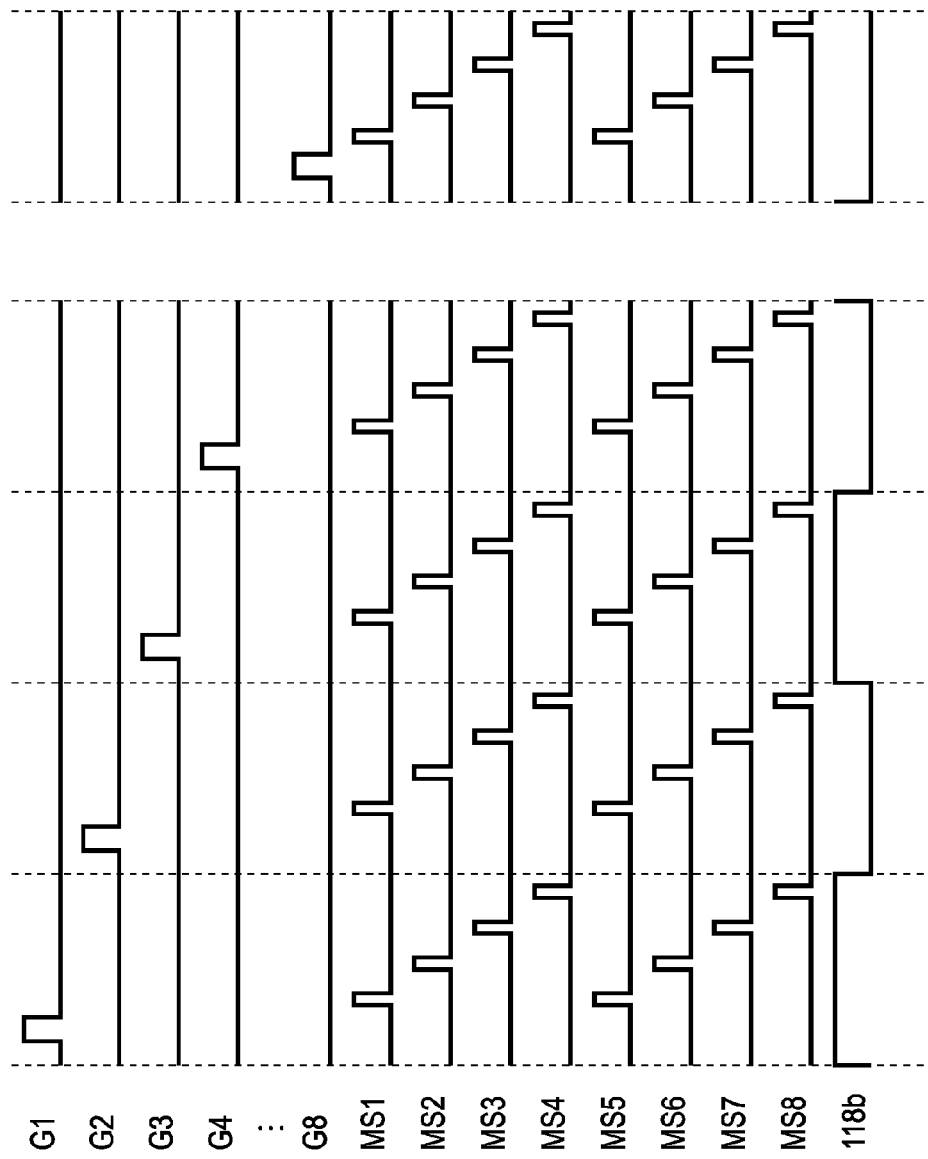
FIG. 6 is a timing chart for use in describing operations of the image pickup apparatus according to the second embodiment of the present invention.

In the present embodiment, it is useful that at least one of the above-described processing be performed in synchronization with scanning on the first and second pixel groups 101a and 101b by the driving circuit 102. FIG. 6 illustrates a timing chart when the second processing in the present embodiment is performed in synchronization with scanning of the detector by the driving circuit. As compared with the first embodiment, in which the processing is performed in synchronization with an operation carried out by the multiplexers, each alteration processing can be performed in synchronization with scanning by the driving circuit at a lower speed, and noise can also be reduced to a low level. Therefore, difficulty in alteration processing can be relieved, and effects caused by noise can be reduced.

FIGS. 7A and 7B illustrate applications to a movable radiation image pickup system that employs the embodiment of the present invention. FIG. 7A is a conceptual diagram of a radiation image pickup system that employs a portable image pickup apparatus capable of fluoroscopy imaging and still imaging. FIG. 7A illustrates the case in which the image pickup apparatus 100 is detached from a C-shaped arm 601 and an image is captured using a radiation generating apparatus 206 attached on the C-shaped arm 601. Here, the C-shaped arm 601 is one that supports the radiation generating apparatus 206 and the image pickup apparatus 100. A display apparatus 602 can display an image based on an image signal obtained by the image pickup apparatus 100. A bed 603 is one on which an object 604 can be placed. A carrier 605 allows the radiation generating apparatus 206, the image pickup apparatus 100, and the C-shaped arm 601 to move. A movable control apparatus 606 has a configuration that can control these components. The control apparatus 606 can also perform image processing on an image signal obtained by the image pickup apparatus 100 and transmit it to the display apparatus 602 or other apparatus. Image data generated by image processing performed by the control apparatus 606 can be transferred to a remote site through a transmission unit, such as a telephone line. In this case, an image can be displayed on a display in a different place, such as a consultation room, or can be stored in a storage medium, such as an optical disc, thus enabling a doctor at a remote location to conduct a diagnosis. In addition, transmitted image data can also be recorded in a film by a film processor. Part or all of the configuration of the controller 110 according to the embodiment of the present invention may also be incorporated in the image pickup apparatus 100 or may also be incorporated in the control apparatus 606.

FIG. 7B illustrates a radiation image pickup system that employs a portable image pickup apparatus capable of fluoroscopy imaging and still imaging. FIG. 7B illustrates the case in which the image pickup apparatus 100 is removed from the C-shaped arm 601 and an image is captured using a radiation generating apparatus 607, which is different from the radiation generating apparatus 206 attached on the C-shaped arm 601. Of course, the controller 110 of the embodiment of the present invention can control the radiation generating apparatus 607, as well as the radiation generating apparatus 206.

The embodiments of the present invention can be achieved by a computer executing a program, for example. A unit configured to supply a program to a computer, for example, a computer-readable recording medium, such as a compact-disk read-only memory (CD-ROM), that stores such a program and a transmission medium, such as the Internet, that can transmit such a program are also applicable as an embodiment of the present invention. The above-described program can also be applied as an embodiment of the present invention. The above program, recording medium, transmission medium, and program product are also included in the scope of the present invention. A combination easily conceivable from the first and second embodiments is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-317275 filed Dec. 12, 2008, which is hereby incorporated by reference herein in its entirety.

What is claimed is:

1. An apparatus comprising:
a signal processing unit electrically connected to a detection unit, wherein the detection unit includes a plurality of pixels arranged in a matrix, each of the plurality of pixels is configured to convert radiation or light into an analog signal, the plurality of pixels are divided into at least a first pixel group and a second pixel group, the signal processing unit includes a first readout circuit configured to read an analog signal output from the first pixel group, a second readout circuit configured to read an analog signal output from the second pixel group, a first A/D converter configured to convert an analog signal from the first readout circuit into a digital signal, and a second A/D converter configured to convert an analog signal from the second readout circuit into a digital signal; and
a control unit configured to perform processing on an A/D conversion characteristic of the first A/D converter, the processing being different from processing on an A/D conversion characteristic of the second A/D converter, on the basis of information regarding nonlinearity of the first A/D converter and information regarding nonlinearity of the second A/D converter.

2. The apparatus according to claim 1, wherein the first readout circuit includes a first multiplexer configured to output analog signals output in parallel from the first pixel group as image signals being serial signals,
the second readout circuit includes a second multiplexer configured to output analog signals output in parallel from the second pixel group as image signals being serial signals, and
the control unit is configured to perform the processing in synchronization with an operation of each of the first and second multiplexers within a period of time for which the control unit processes analog signals from a plurality of pixels arranged in a column direction among the plurality of pixels included in the detection unit.

3. The apparatus according to claim 1, wherein the control unit is configured to control one of the signal processing unit and the power supply unit so as to obtain an image signal in image capturing and a correction image signal for use in correction of the image signal in image capturing by performing substantially the same processing.

4. The apparatus according to claim 1, wherein the processing is different from alteration of the A/D conversion characteristic of the second A/D converter.

5. The apparatus according to claim 1, further comprising a power supply unit configured to supply components included in the signal processing unit with respective biases,
wherein the control unit is configured to alter the A/D conversion characteristic of at least one of the first and second A/D converters by controlling the power supply unit to alter at least one of a reference voltage to be supplied to the first A/D converter and a reference voltage to be supplied to the second A/D converter.

6. The apparatus according to claim 1, further comprising a driving circuit configured to perform scanning on the first and second pixel groups,
wherein the control unit is configured to perform the processing in synchronization with the scanning performed by the driving circuit.

7. An image pickup system comprising the apparatus according to claim 1.

* * * * *